(12) United States Patent
Braune et al.

(10) Patent No.: US 7,963,137 B2
(45) Date of Patent: Jun. 21, 2011

(54) APPARATUS COMPRISING A PROTECTION DEVICE

(75) Inventors: Ingolf Braune, Gundelfingen (DE); Heiko Kahle, Freiburg (DE)

(73) Assignee: Sick AG, Waldkirch/Breisgau (DE)

( * ) Notice: Subject to any disclaimer, the term of this patent is extended or adjusted under 35 U.S.C. 154(b) by 743 days.

(21) Appl. No.: 10/961,538

(22) Filed: Oct. 8, 2004

(65) Prior Publication Data

US 2005/0076688 A1  Apr. 14, 2005

(30) Foreign Application Priority Data

Oct. 9, 2003  (DE) .................................. 103 46 918

(51) Int. Cl.
*B21C 51/00* (2006.01)

(52) U.S. Cl. ............................ 72/31.11; 72/37; 100/341

(58) Field of Classification Search ............... 72/31.1, 72/389.1, 389.3, 14.3, 21.1, 21.3, 31.11, 72/37; 192/129 A, 130, 134; 100/348, 341; 250/221, 222.1; 340/680; 83/DIG. 1
See application file for complete search history.

(56) References Cited

U.S. PATENT DOCUMENTS

| | | | | |
|---|---|---|---|---|
| 4,660,703 A | * | 4/1987 | Filcich et al. ................. | 192/130 |
| 5,375,063 A | * | 12/1994 | Peck et al. ..................... | 700/136 |
| 5,579,884 A | * | 12/1996 | Appleyard et al. ........... | 192/130 |
| 6,752,253 B2 | * | 6/2004 | Fiessler .......................... | 192/130 |
| 6,919,554 B2 | * | 7/2005 | Braune et al. .................. | 250/221 |
| 6,980,133 B2 | * | 12/2005 | Foong .............................. | 341/20 |
| 2002/0134922 A1 | * | 9/2002 | Appleyard et al. ........... | 250/221 |

FOREIGN PATENT DOCUMENTS

| | | |
|---|---|---|
| DE | 196 31 579 A1 | 2/1998 |
| DE | 197 17 299 | 2/1998 |
| DE | 198 09 709 | 9/1999 |
| DE | 299 20 715 | 3/2000 |
| DE | 202 17 426 U1 | 2/2003 |
| EP | 1 331 433 | 1/2003 |
| WO | WO 02/093499 | 11/2002 |

OTHER PUBLICATIONS

Schmersal, Mounting and Wiring Instructions/Safety foot switches, Jul. 2006.*
German Search Report dated Jan. 30, 2004 (with English translation).

* cited by examiner

*Primary Examiner* — Debra M Sullivan
(74) *Attorney, Agent, or Firm* — Harness, Dickey & Pierce, P.L.C.

(57) ABSTRACT

The invention relates to an apparatus, in particular to a bending apparatus, including at least one movable apparatus part; an operating device for the operation of the apparatus, with at least one first signal for the actuation of the apparatus and one second signal for the stopping of the apparatus being able to be triggered via the operating device; a protection device for the monitoring of a protected zone of the apparatus; and a device for the selective adaptation of the protected zone before the actuation of the apparatus, with the device for the adaptation of the protected zone being able to be acted on by means of a third signal of the operating device. Alternatively, the device for the selective adaptation of the protected zone can include a voice input device.

13 Claims, 3 Drawing Sheets

APPARATUS COMPRISING A PROTECTION DEVICE

FIELD OF THE INVENTION

The present invention relates to an apparatus, in particular to a bending apparatus.

BACKGROUND OF THE INVENTION

Bending presses are known which use a light barrier arrangement to monitor a protected zone. For some processing procedures it is necessary to deactivate one or more light barriers in order to directly permit specific interventions in the protected zone. This takes place in accordance with the prior art, for example, by an emergency stop of the apparatus which is triggered by the intervention which ultimately has to be permitted and by a subsequent, repeated start pulse of the operator to continue the processing procedure, with defined light barriers then being deactivated during this continuation of the processing procedure. However, this has the disadvantage that the processing procedure is interrupted.

It is alternatively known to provide an additional switch to switch off the light barriers which is actuated prior to the start of the bending procedure, which results in specific light barriers being deactivated for a single, subsequent bending procedure. Such a bending press is known, for example, from DE 197 17 299 A1. However, this has the disadvantage that an additional switch to be actuated has to be provided at the bending press and has to be actuated by the operator.

SUMMARY OF THE INVENTION

It is thus an object of the present invention to provide an apparatus which permits an adaptation of a protected zone of an apparatus in a simple and cost-favorable manner.

In accordance with a first solution variant of the invention, an apparatus, in particular a bending apparatus, is provided comprising at least one movable apparatus part, an operating device for the operation of the apparatus, with at least one first signal for the actuation of the apparatus and one second signal for the stopping of the apparatus being able to be triggered via the operating device, a protection device for the monitoring of a protected zone of the apparatus and a device for the selective adaptation of the protected zone before the actuation of the apparatus, wherein the device for the adaptation of the protected zone can be acted on by means of a third signal of the operating device.

The operating device can thus be signaled with the help of the third signal that the protected zone should be changed, preferably reduced.

The protected zone is preferably a zone close to the movable apparatus part. It can be monitored with the help of the protection device whether, for example, an object or a part of a human body is located in a danger zone of the apparatus.

A further signal, by means of which an emergency stop of the apparatus can be triggered, can preferably additionally be output via the operating device.

The operating device preferably comprises a switch, in particular a foot switch.

The third signal of the operating device can preferably be triggered by a multiple actuation of the operating device. Provision can in particular be made for the third signal to be triggered by a dual actuation or by a two-fold actuation of the operating device succeeding one another fast.

Alternatively, the third signal of the operating device can be triggered using an additional switch position. In this process, the additional switch position can be realized in that the switch is brought into a position at times, in particular prior to the actual machining procedure, which is disposed substantially opposite the actuation position or is substantially opposed to it. With a foot switch, this additional switch position can accordingly be reached e.g. by a raising of the foot switch.

In accordance with a second solution variant of the invention, an apparatus, in particular a bending apparatus, is furthermore provided comprising at least one movable apparatus part, an operating device for the operation of the apparatus, with at least one first signal for the actuation of the apparatus and one second signal for the stopping of the apparatus being able to be triggered via the operating device, a protection device for the monitoring of a protected zone of the apparatus; and a device for the selective adaptation of the protected zone before the actuation of the apparatus, wherein the device for the adaptation of the protected zone includes a voice input device.

Furthermore, a voice processing device is preferably provided for the processing of the input data, in particular voice data. The solution variant with the voice input device is explained in more detail as part of the description of the Figures.

The following preferred embodiments of the invention can be used in both solution variants described above.

The protection device of an apparatus in accordance with the invention preferably has a standard setting for the protected zone and the apparatus furthermore comprises a reset device for the automatic resetting of the protected zone to the standard setting after every completed machining procedure of the apparatus.

Provision can additionally be made for the protected zone to be reset to the standard setting in each case on the switching on or initialization of the apparatus.

In a preferred embodiment, the device for the adaptation of the protected zone furthermore comprises an additional selection device for the selection of the protected zone. In this case, it can preferably be signaled by means of the operating device or of the voice input device that a protected zone should be provided which differs from the standard setting and it can be selected by the selection device how the protected zone should specifically be changed. A protected zone can preferably be selected by means of the selection device from at least two different protected zones different from the standard setting.

The protected zone preferably comprises at least one light barrier. A light barrier arrangement having a plurality of light barriers can further preferably be provided.

Alternatively, the protection device for the monitoring of a volumetric protective field with a pre-determined extent of the protective field can have a transmitter device for the transmission of at least one light beam and a receiver device for the detection of the at least one light beam, with the extent of the protective field being variably adjustable. It is preferred in this process for the transmitter device to consist of at least one light source, in particular of a laser diode whose transmitted light is expanded by an optical transmitter device and for the receiver device to consist of an areal arrangement of individual receivers, in particular of a CMOS matrix, with at least specific, preferably all, individual receivers being directly actuable and de-actuable.

The protection device furthermore preferably comprises a device for the stopping of the apparatus when an abnormality has been detected in the protected zone. An abnormality can in particular occur when, for example, an object or a part of a human body is located in the protected zone active at that moment during operation.

The protection device is preferably arranged on the movable apparatus part and is movable with it. It can thus be achieved that the danger zone in the proximity to the movable apparatus part is monitored continuously. Furthermore, this means that the whole zone in which the movable apparatus part can move does not have to be monitored with an unnecessarily extensive or large protection device.

Furthermore, in accordance with the invention, the use of a protection device and of an operating device of the invention or of a preferred embodiment thereof, to secure an apparatus, in particular a bending apparatus, is proposed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
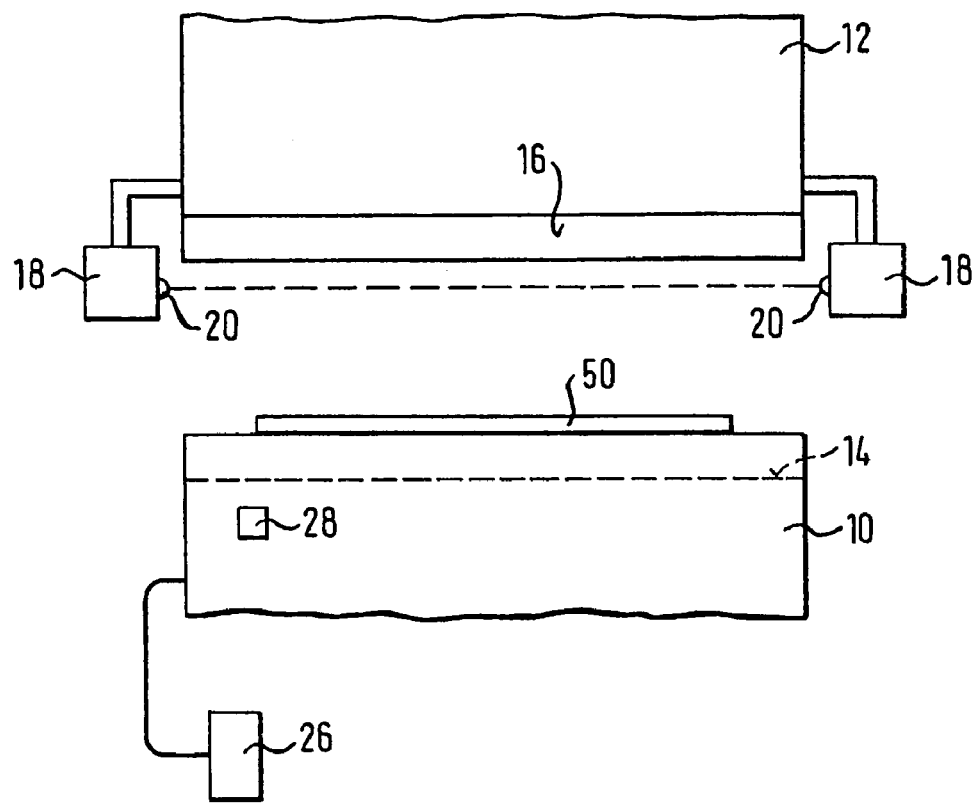
FIG. 1 is a front view of an apparatus in accordance with a preferred embodiment of the invention with a workpiece arranged thereon.
Figure 2:
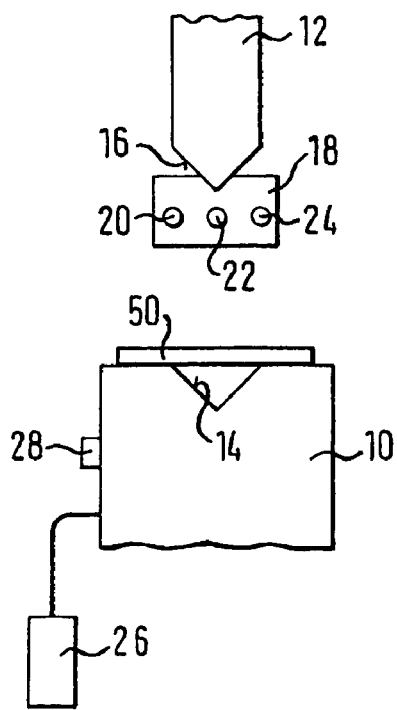
FIG. 2 is a side view of the apparatus of FIG. 1.

An apparatus in accordance with a first preferred embodiment will be described in detail in the following with reference to FIGS. 1 and 2. The apparatus shown is a bending press. The apparatus comprises a fixed bottom tool 10 and a top tool 12 movable relative to the bottom tool 10. Alternatively, provision can be made for the bottom tool 10 to be movable and for the top tool 12 to be fixed or for both tools 10, 12 to be movable.

A workpiece 50 to be machined can be arranged on the bottom tool 10. In the embodiment shown, a cut-out 14 is provided into which regions of the workpiece can enter when it is machined and/or bent.

The top tool 12, which can be moved toward and away from the bottom tool 10, comprises a section 16 which is complementary in shape to the cut-out 14 and which enters into the cut-out 14 and thus deforms the workpiece 50 during the machining process.

A protection device 18 is provided at the top tool 12. The protection device 18 includes three light barriers 20, 22, 24 (see also FIG. 2) in the embodiment shown. The light barriers 20, 22, 24 are arranged such that they form a protected zone which at least partly surrounds the section 16. A part of a human body, such as a finger or a hand, present, for example in the orbit of movement of the top tool 12 can thereby be detected and the machining process can be interrupted to avoid any injury to the operator. If all light barriers 20, 22, 24 are activated, this is designated as the standard setting of the light barriers. The arrangement and number of the light barriers 20, 22, 24 can be varied as desired depending on the application.

The protection device 18 is furthermore designed such that the light barriers are deactivated when the top tool 12 is located so close to the workpiece to be machined that a presence of an unwanted object or of a part of a human body in the intermediate space between the top tool and the bottom tool can substantially be precluded.

The operation of the apparatus takes place by means of a foot pedal 26. The foot pedal 26 comprises at least three positions into which it can be brought. If the foot pedal 26 is located in the first position, this corresponds to a state of rest of the apparatus. The operation of the apparatus can furthermore be stopped if the foot pedal 26 is brought into the first position. A working function or a machining function of the apparatus can be activated with the help of the second position of the foot pedal 26. The foot pedal 26 must preferably be held in the second position during the whole machining process. The third position permits a so-called emergency stop. In this process, the movement of the apparatus is stopped and the apparatus is blocked in the momentary switch position.

In addition to the three positions described above, a further, in this case a fourth, position is provided in the foot pedal 26 in accordance with the first preferred embodiment of the invention. When the foot pedal 26 is brought into this fourth position, one or more of the light barriers 20, 22, 24 can be switched off for a single machining process in a defined manner. A protected zone differing from the standard setting, in particular a smaller or reduced protected zone can thus be set. A reduction of the protected zone is in particular of advantage when a workpiece should be machined, from which regions project into the protected zone during the machining process and would thus result in an unwanted stopping of the apparatus. The fourth position is preferably designed such that it is reached by a movement of the foot pedal 26 in a direction which is substantially opposed to or opposite to the direction of movement toward the second position.

Furthermore, an additional switch 28 is provided at the apparatus as a selection device by means of which difference combinations of light barriers 20, 22, 24 can be set which are to be deactivated depending on the application. Depending on which type of workpiece should be machined, it can be necessary to switch off one or more light barriers 20, 22, 24 to permit interruption-free operation. The switch 28 can preferably be brought into at least two positions. At least two settings deviating from the standard setting of the light barriers can thereby be provided for in particular two reduced protected zones different from one another.

The operation of the apparatus described above will be described in the following with reference to FIGS. 1 to 3.

First, the so-called "standard operation" of the apparatus will be described with reference to FIGS. 1 and 2. In this process, a workpiece 50 is machined for which the standard setting for the protected zone can be used.

The operator places the workpiece 50 onto the bottom tool 10 and brings the foot pedal 26 from the first to the second position. The machining process is thereby started. The top tool 12 moves toward the bottom tool 10 and comes into contact with the workpiece 50. The workpiece is thereby deformed, in particular bent.

If an object or a part of a human body moves into the orbit of movement of the upper tool 12 in an unforeseen manner during the machining process, and in particular moves into the protected zone set up by all three light barriers 20, 22, 24, the movement of the top tool 12 is stopped immediately in order e.g. to avoid injury to the operator.

The operation of the apparatus will be described in the following when a workpiece 52 should be machined for which a reduced protected zone has to be provided. This case is shown in FIG. 3.

Figure 3:
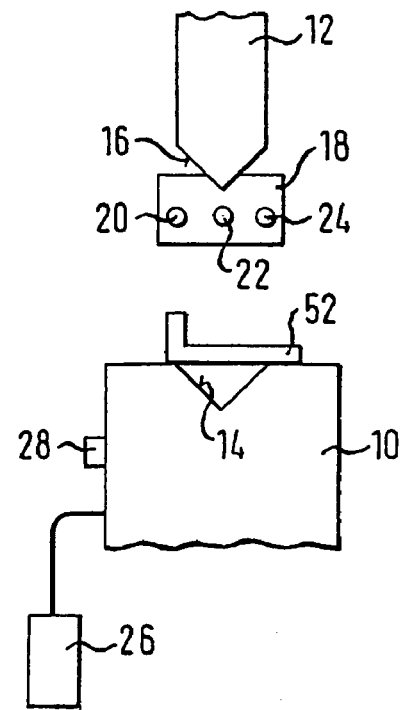
FIG. 3 is a side view in accordance with FIG. 2 with a different workpiece arranged thereon.

During the movement of the top tool 12 toward the bottom tool 10, the region of the workpiece 52 projecting upward in FIG. 3 moves into the space covered by the light barrier 20 and would thus result in an unwanted interruption of the machining process. It is thus necessary to reduce the protected zone in this case. For this purpose, the operator first uses the switch 28 to select how the protected zone should be reduced, i.e. which of the light barriers 20, 22, 24 should be switched off. The light barrier 20 is switched off in the present case.

To confirm that the protected zone should really be reduced in the pre-set manner for a specific machining process to be carried out, the operator moves the foot pedal 26 into the fourth position before the start of the actual machining process. It is thereby signaled to the protection device that the light barrier 20 should be switched off for the following machining process in the present case. The machining process will subsequently be carried out as described with reference to FIGS. 1 and 2 without any unnecessary interruption. The signaling that the protected zone should be reduced thus takes place with the help of the foot pedal 26.

After the machining process has been ended, the protected zone is returned to the standard setting. It is thus prevented that a reduced protected zone is accidentally used in a subsequent machining process. For a following machining process, the reduced protected zone would again have to be selected by a selective actuation of the foot pedal 26 into its fourth position and, optionally, by actuation of the switch 28.

Alternatively to the provision of the fourth position of the foot pedal 26, the signaling or confirmation of the changed protected zone can be carried out in that the foot pedal 26 is brought into the second position successively twice before the actual machining process. The machining process is then carried out as described above.

In a further preferred embodiment, the switch 28 can be dispensed with. This will be described in the following.

For the case that only one limited protected zone, preferably a fixedly set one, is provided, it can be signaled with the help of the foot pedal 26, as described above, that the protected zone should be limited.

If, in contrast, a plurality of different reduced protected zones are provided, additional foot pedal settings can be provided by means of which the respected protected zone to be used can be selected. Alternatively, the signaling can take place by a different, multiple actuation of the foot pedal 26.

Figure 6:
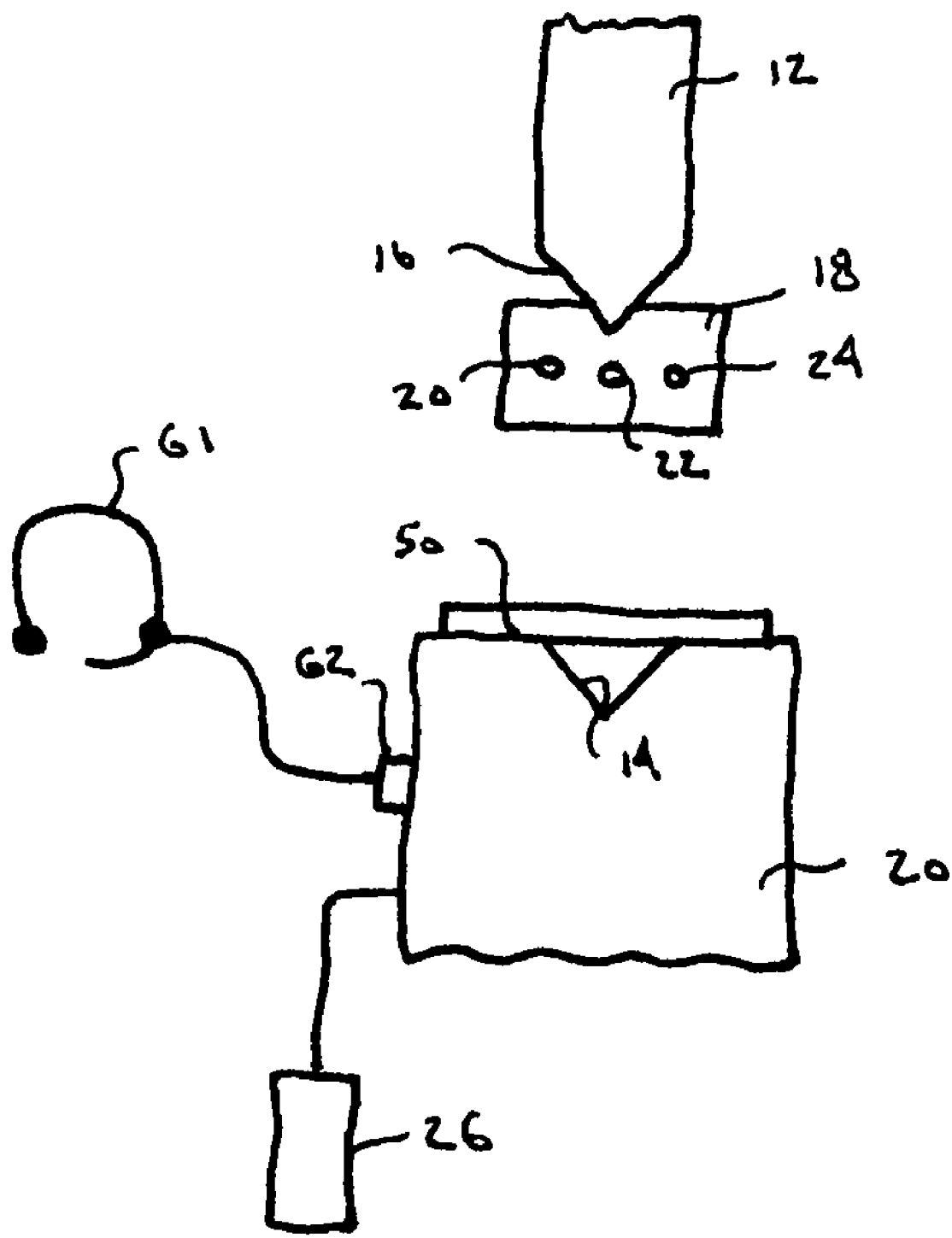
FIG. 6 is a side view of an alternative embodiment of the apparatus of FIG. 1 having a voice input device.

In a further preferred embodiment (not shown), the signaling of the changed protected zone takes place by means of a voice input device 61 as shown in FIG. 6.

The additional foot pedal setting can be dispensed with in this process. The operator indicates that the protected zone should be reduced by a voice input. This input is processed with the aid of a voice recognition device.

Command words and/or command phrases are preferably used for the voice input. The voice input preferably takes place via headset in order to ensure better recognition performance.

In this embodiment, a switch can be provided for the selection of the reduced protected zone in accordance with the embodiment described with reference to FIGS. 1 to 3. In this case, it is confirmed or signaled by the voice input that the protected zone as selected by the switch should be reduced.

Alternatively, the switch can be dispensed with. In this case, the indication of how the protected zone should be reduced is likewise signaled by the voice input. The foot switch can moreover be completely omitted if the activation of the machining process is also realized by means of voice input.

It is furthermore conceivable that the activation of the reduced protected zone takes place by means of the foot pedal 26 and the indication of how the changed protected zone should be designed is realized by voice input.

Figure 5:
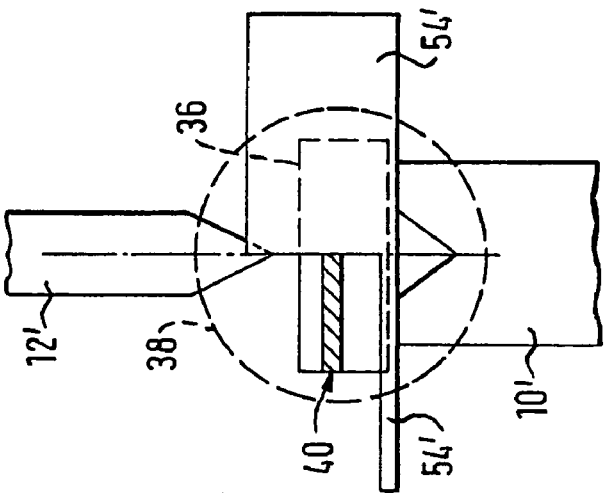
FIG. 5 is a schematic side view of parts of the apparatus in accordance with FIG. 4 with a reduced protected zone.
Figure 4:
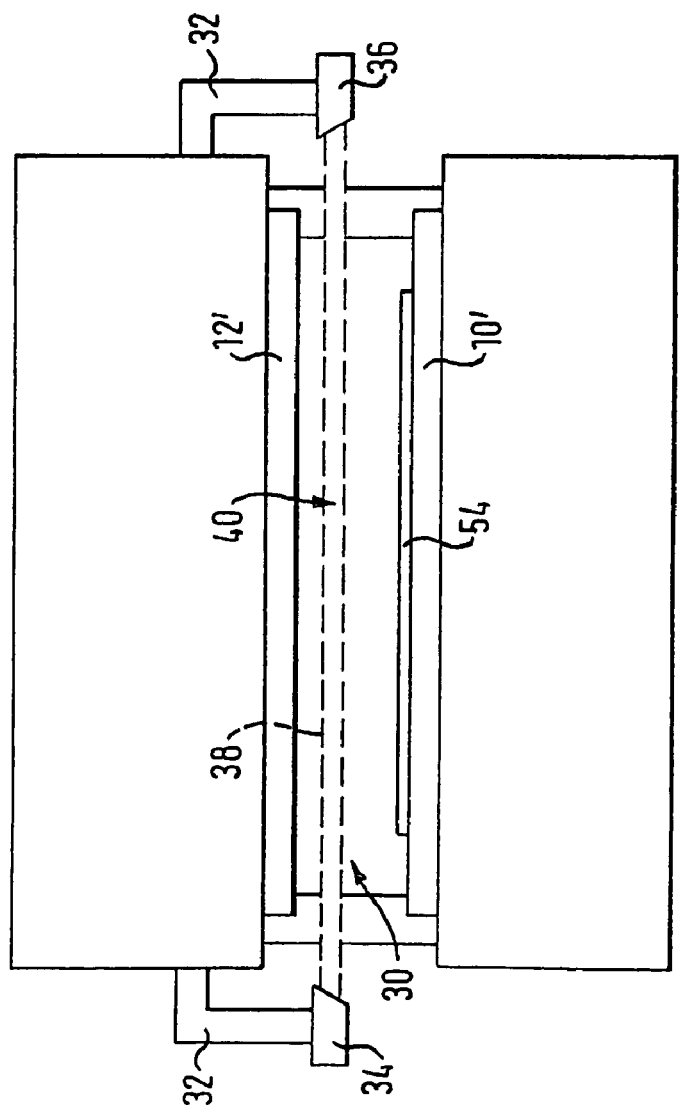
FIG. 4 is a front view of an apparatus in accordance with a preferred embodiment of the invention which a workpiece arranged thereon.

The following description of FIGS. 4 and 5 relates to an alternative embodiment of the protection device, with the device for the adaptation of the protected zone being able to be designed in the embodiment in the same way as described above in connection with FIGS. 1 to 3.

The apparatus shown in FIG. 4, which is made as a stamping press, has a top tool 12' which can be driven to make a work movement vertically downwardly toward a bottom tool 10' in order to bend a workpiece 54 lying on the bottom tool 10'. An open gap 30 between the top tool 12' and the workpiece 54 is gradually closed during this work movement.

A respective holding arm 32 is provided at both sides of the top tool 12'. The holding arms 32 carry a transmitter device 34 and a spatially resolving receiver device 36 which are parts of an optoelectronic sensor. The transmitter device 34 has a laser diode with an optical transmitter device (not shown in the Figures) which expands the transmitted light of the laser diode into a light beam 38. The receiver device 36 has a rectangular CMOS matrix receiver on which the light beam 38 acts.

The light beam 38 passes through the open gap 30 beneath the top tool 12'. The outline of the activated part of the receiver device 36 thus defines a volumetric protected field 40 within the light beam 38 between the top tool 12' and the bottom tool 10', as will be explained in the following. As soon as an evaluation and control device of the sensor (not shown in the Figures) detects an interruption of the light beam 38 inside the protected field 40, it triggers a switch-off process to stop the top tool 12'. An operator, for example introducing the workpiece 54 into the open gap 30, is thereby protected from injury by the top tool 12'.

FIG. 5a shows the position of the top tool 12, of the light beam 38, of the receiver device 36 and of the protected field 40. A box to be machined is placed on the bottom tool 10' as the workpiece 54' here. The box 54' would intrude into a protected field which would be present on activation of all receiver elements of the receiver device 36. Accordingly, in accordance with FIG. 5, work is only carried out with a reduced protected field 40 into which no part of the box 54' can intrude in the bending process so that no interruption of the bending process takes place.

The switching between a maximally possible protected field in which all receiver elements of the receiver device 36 are activated and a reduced protected field 40 in accordance with FIG. 5 can take place in accordance with any one of the principles in accordance with the invention explained above.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A bending press brake apparatus, comprising:
   at least one movable bending tool (12);
   a protection device (18) for the monitoring of a protected zone of the apparatus to determine whether an object or a part of a human body is located in the protected zone; and
   a switch (26) movable by an operator between at least three different selectable positions for operating the apparatus, where the switch actuates the bending tool when placed in a first position, confirms a reduction of the protected zone of the protection device prior to and without actuation of the bending tool and without eliminating the protected zone when placed in a second position, and stops the bending tool when placed in a third position.

2. An apparatus in accordance with claim 1, characterized in that the switch is a foot switch.

3. An apparatus in accordance with claim 2, characterized in that the switch (26) can be triggered using an additional switch position.

4. An apparatus in accordance with claim 1, characterized in that the protection device (18) has a standard setting for the protected zone and the apparatus furthermore comprises a reset device for the automatic resetting of the protected zone to the standard setting after every actuation of the apparatus.

5. An apparatus in accordance with claim 1, characterized in that the protection device (18) comprises at least one light barrier (20, 22, 24).

6. An apparatus in accordance with claim 1, characterized in that the protection device for the monitoring of a volumetric protective field with a pre-determined extent of the protective field has a transmitter device (34) for the transmission of at least one light beam (38) and a receiver device (36) for the detection of the at least one light beam (38), with the extent of the protective field being variably adjustable.

7. An apparatus in accordance with claim 6, characterized in that the transmitter device (34) consists of at least one light source, in particular of a laser diode, whose transmitted light is expanded by an optical transmitter device; and in that the receiver device (36) consists of an areal arrangement of individual receivers, in particular of a CMOS matrix, with at least specific, preferably all, individual receivers being directly actuable and de-actuable.

8. An apparatus in accordance with claim 1, characterized in that the protection device (18) furthermore comprises a device for the stopping of the apparatus when an abnormality has been detected in the protected zone.

9. An apparatus in accordance with claim 1, characterized in that the protection device (18) is arranged at the movable apparatus part (12).

10. The apparatus in accordance with claim 1 further comprising an additional switch movable by an operator to select one of two or more reduced protected zone configurations.

11. A bending press brake apparatus, comprising:
    at least one movable bending tool (12);
    a protection device (18) for the monitoring of a protected zone of the apparatus to determine whether an object or a part of a human body is located in the protected zone; and
    a switch (26) movable by an operator between at least three different selectable modes for operating the apparatus, where the switch actuates the bending tool when placed in a first position, confirms a reduction of the protected zone of the protection device prior to and without actuating the bending tool when brought into the first position successively twice, and stops the bending tool when placed in a second position.

12. The apparatus in accordance with claim 11, characterized in that the switch is a foot pedal.

13. The apparatus in accordance with claim 1 further comprising an additional switch movable by an operator to select one of two or more reduced protected zone configurations.

* * * * *